(12) United States Patent
Krantz et al.

(10) Patent No.: US 8,195,327 B2
(45) Date of Patent: Jun. 5, 2012

(54) SCALABLE FREIGHT LOADING SYSTEM, ESPECIALLY FOR AN AIRCRAFT

(75) Inventors: Willi Krantz, Bremerhaven (DE); Ekkehard Zischow, Bremen (DE)

(73) Assignee: Rheinmetall Defence Electronics GmbH, Bremen (DE)

( * ) Notice: Subject to any disclaimer, the term of this patent is extended or adjusted under 35 U.S.C. 154(b) by 831 days.

(21) Appl. No.: 11/991,009

(22) PCT Filed: Jun. 9, 2006

(86) PCT No.: PCT/EP2006/005514
§ 371 (c)(1),
(2), (4) Date: Dec. 1, 2008

(87) PCT Pub. No.: WO2007/022814
PCT Pub. Date: Mar. 1, 2007

(65) Prior Publication Data
US 2009/0092471 A1     Apr. 9, 2009

(30) Foreign Application Priority Data

Aug. 26, 2005   (DE) .................. 10 2005 040 408

(51) Int. Cl.
G06F 7/00         (2006.01)
G08B 21/00        (2006.01)
B65G 13/02        (2006.01)
(52) U.S. Cl. ........ 700/228; 700/213; 700/222; 340/679; 198/782
(58) Field of Classification Search .................. None
See application file for complete search history.

(56) References Cited

U.S. PATENT DOCUMENTS

| 4,225,926 | A  | * | 9/1980 | Wendt ........................... 701/124 |
| 5,186,417 | A  | * | 2/1993 | Pritchard ..................... 244/137.1 |
| 5,213,201 | A  |   | 5/1993 | Huber et al. |
| 6,867,702 | B2 | * | 3/2005 | Huber et al. .................. 340/679 |
| 6,867,926 | B2 | * | 3/2005 | Iikawa et al. ................. 359/701 |

FOREIGN PATENT DOCUMENTS

| EP | 0 512 572 B1 | 9/1997 |
| EP | 0 769 450 B1 | 2/2003 |

OTHER PUBLICATIONS

International Search Report, Sep. 14, 2006.

* cited by examiner

*Primary Examiner* — Gene Crawford
*Assistant Examiner* — Yolanda Jones
(74) *Attorney, Agent, or Firm* — Venable LLP; Jeffri A. Kaminski

(57) ABSTRACT

The invention relates to a scalable freight loading system, especially for an aircraft, said system comprising drive means (L1-L9, R1-R9), covering sensors, bolts, proximity switches (PL1-PL9, PR1-PR9), and a central control device (CCB). According to the invention, the loading surface is divided into sectors (S1, S2, S3); a local control unit (SCB1, SCB2, SCB3) is associated with each sector; the drive means, covering sensors, and proximity switches of a sector are connected to IO ports of the local control unit; and the local control units are connected to the central control unit by means of a bus system (CAN-Bus).

9 Claims, 2 Drawing Sheets

SCALABLE FREIGHT LOADING SYSTEM, ESPECIALLY FOR AN AIRCRAFT

TECHNICAL FIELD

Figure 1:
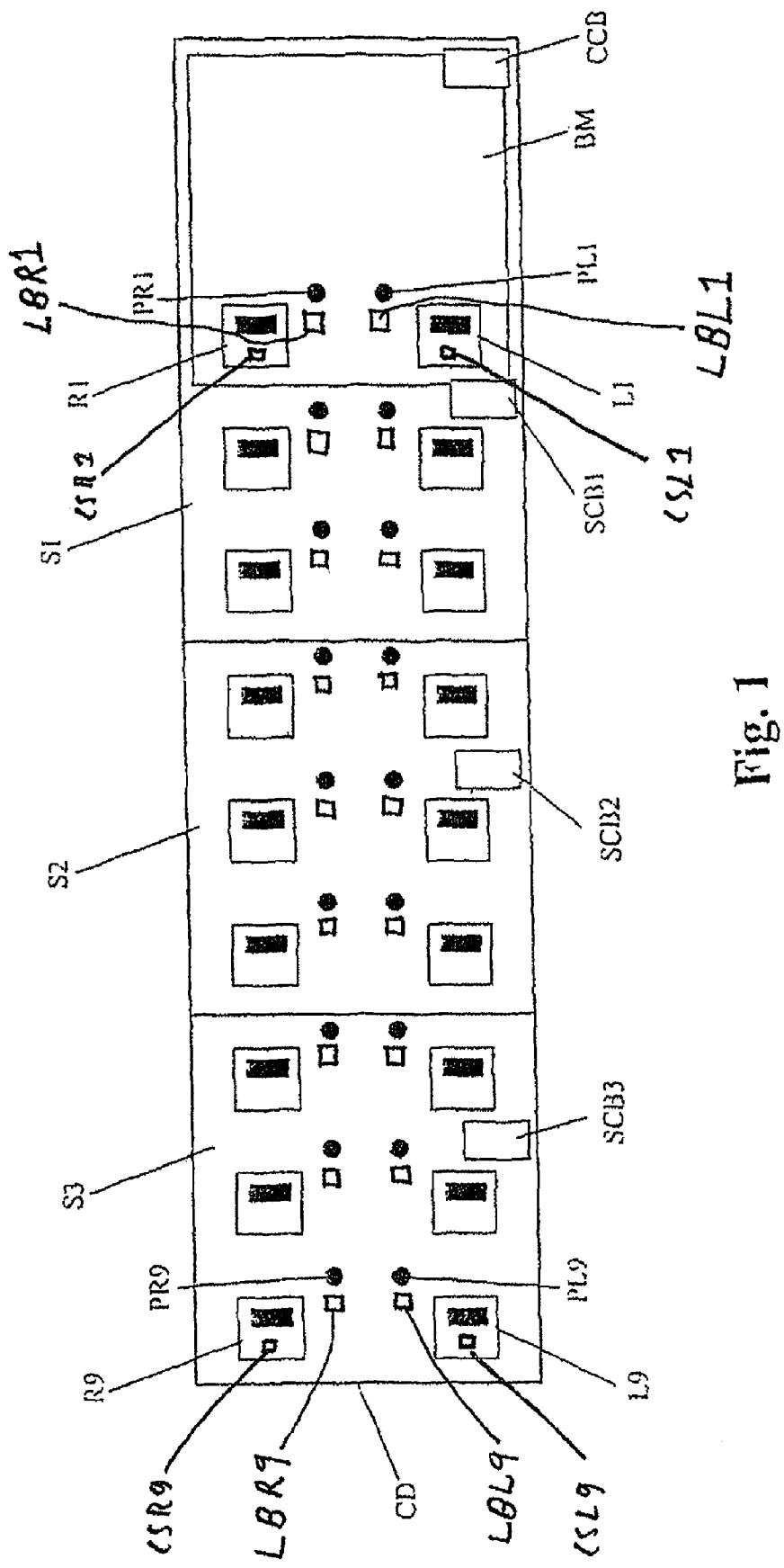

The present invention relates to a scalable freight loading system, especially for an aircraft.

PRIOR ART

Freight loading systems provided with drive means such as the so-called power drive units (PDU) are used for loading a freight item, for example a container or a pallet, into a transport means and to rearrange this item within the transport means. Systems of this type are furthermore provided with covering sensors, proximity switches, and locking bars for securing the freight items. A covering sensor determines whether the associated drive means is covered by the freight item while a proximity switch monitors the status of a locking bar. The freight loading system is controlled by a central control unit, for example by entering drive commands with the aid of a joystick or other input means.

According to the presently known prior art, individual components of the freight loading system, such as the drive means and the sensors, are generally connected via serial interfaces to the central control unit, wherein this has the disadvantage that the central control unit must be provided with and must manage a corresponding number of input/output (I/O) ports. If all these ports are occupied, a later expansion of the freight loading system is possible only through replacing the central control unit.

According to a different option, all components of the freight loading system can be connected via a data bus to the central control unit. The disadvantage of this option is that even simple components such as proximity switches must be provided with a bus interface, which can be more expensive to realize than the component to be connected.

REPRESENTATION OF THE INVENTION

It is consequently the object of the present invention to provide an easily scalable, cost-effective and easy to maintain freight loading system. It is furthermore the object of the present invention to provide a method for operating a scalable freight loading system of this type.

This object is solved with a scalable freight loading system as disclosed in patent claim 1 and with a method for operating such a freight loading system as disclosed in claim 5. Advantageous embodiments follow from the dependent patent claims.

A scalable freight loading system according to the invention comprises drive means, covering sensors, locking bars, proximity switches and a central control unit. The loading surface for this system is divided into sectors and a local control unit is assigned to each sector; the drive means, the covering sensors and the proximity switches of a sector are connected to I/O ports of the local control unit; and the local control units are connected via a bus system to the central control unit. During the operation of such a scalable freight loading system, the local control units transmit the status of the drive means, the covering sensors and the proximity switches via the bus system.

The advantage of dividing the loading surface into sectors is that a local control unit, also called a sector control box (SCB), which is assigned to a sector requires only a limited number of I/O ports. If a large loading surface is to be equipped with a freight loading system, then a corresponding number of SCBs must be used. Since the SCBs are connected via a bus system to the central control unit (CCB: compartment control box), the number of possible sectors is limited only by the number of SCBs that can be addressed via the bus system.

Owing to the fact that each SCB uses the bus system to transmit the sector status, meaning information on which drive means and proximity switches exist in the corresponding sector as well as the status of the covering sensors and the proximity switches, each SCB is provided with the image and status of the complete freight loading system. The local control units are provided for this purpose with storage devices for storing the status data of all sectors.

According to one embodiment of the invention, the bus system is an established and reliable CAN bus system (CAN: controller area network). The sector status is preferably transmitted as a standardized status object of the CAN bus. In that case, the sector status is encoded in the user data for the status object while the SCB address is extracted from the message header and the associated sector is thus identified.

The sector status is preferably transmitted by a local control unit at the start-up of the freight loading system and/or in case of a change in the sector status. An initialization takes place at the start-up of the freight loading system, after which each of the SCBs is familiar with the image and the status of the freight loading system. These data need to be updated only in case of a status change for the sector components.

The drive means for one embodiment of the invention are floor conveyors, in particular roller conveyors. Drive means of this type are known as PDUs (power drive unit) for freight loading systems.

To reduce wear on the drive means and lower the energy consumption, it is standard practice with freight loading systems to activate or put into operation only those drive means which are covered by a freight item. According to one embodiment of the invention, a drive means that is not covered by a freight item is also activated if it is arranged behind a drive means that is covered by a freight item, as seen in transporting direction. That is to say, a drive means that will be activated next in the transporting sequence will be activated ahead of time, thereby preventing a jolt-type force to be exerted onto the freight item during the activation of the drive means.

Once a freight item has reached its end position on the loading surface, a locking bar is raised for securing the freight item. Proximity switches are used to determine whether a locking bar has been raised. According to one embodiment of the invention, a drive means is not activated when it is located behind a raised locking bar, as seen in the direction of looking into a cargo compartment. This is designed to prevent the activation of a drive means located underneath a previously secured freight item because it would result in increased wear.

The invention is to be explained in further detail with the aid of an exemplary embodiment.

SHORT DESCRIPTION OF THE DRAWING

Shown are in:

FIG. 1 The physical arrangement of a freight loading system and

Figure 2:
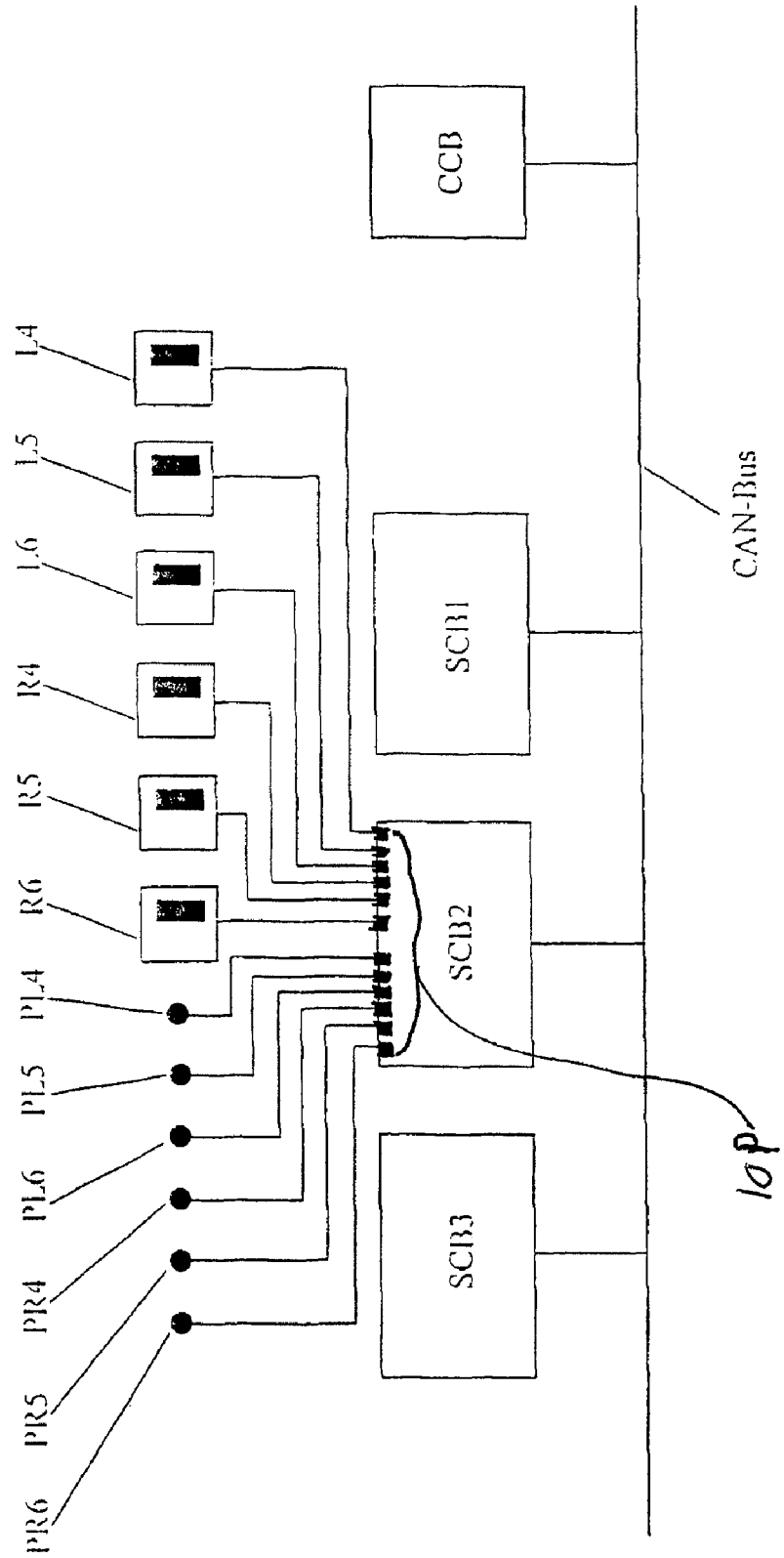

FIG. 2 the logical configuration of a freight loading system.

STEPS FOR EMBODYING THE INVENTION

FIG. 1 shows a frontal outline of the cargo compartment CD of an airplane. This cargo compartment comprises a ball mat area BM and a loading surface that is divided into the three sectors S1, S2 and S3. Each sector is provided with six drive means and six proximity switches, wherein each proximity switch functions to monitor the status of a locking bar, which is not shown in the Figure. The total of 18 drive means L1 to L9 and R1 to R9, as well as the 18 proximity switches PL1 to PL9 and PR1 to PR9 are respectively arranged in two rows, referred to as right and left row, as seen from the ball mat area into the cargo compartment CD. The drive means in each row, the PDUs according to the present example, as well as the proximity switches are numbered continuously. The PDUs L1, L2, L3; R1, R2 and R3, as well as the proximity switches PL1, PL2, PL3, PR1, PR2, and PR3 are thus located in the sector S1. A local control unit is furthermore assigned to each sector. The control unit SCB1 is assigned to the sector S1 while the control unit SCB2 is assigned to the sector S2 and the control unit SCB3 is assigned to the sector S3. The freight loading system is furthermore provided with covering sensors, not shown in the Figures, which detect whether a PDU is covered by a freight item. To provide a clearer picture, FIG. 1 does not show each PDU and a reference number is not given to each proximity switch.

The freight loading system is additionally provided with a central control unit CCB, which is connected to at least one operating panel, not shown herein. This control unit is used by the operating personnel to input control information into the CCB, for example with the aid of a joystick that is not shown herein.

If a freight item is transported into the cargo compartment CD, meaning it is transported from right to left in FIG. 1, then the sector S3 is located behind the sector S2 and the sector Si is located in front of the sector S2, as seen in transporting direction. If the freight item is transported out of the cargo compartment CD, however, the sector S1 is always located behind the sector S2, as seen in transporting direction. Regardless, the viewing direction into the cargo compartment CD always originates with a location in the area of the ball mat BM and therefore does not depend on the direction of transport for the freight item.

FIG. 2 shows a detail of the logic configuration for the freight loading system according to the invention, wherein the three local control units SCB1, SCB2 and SCB3, as well as the central control unit CCB are interconnected via a CAN bus. The example furthermore shows the connections of the drive means and the proximity switches to the local control unit SCB2 for the sector S2. The PDUs L4, L5, L6, R4, R5, and R6 as well as the proximity switches PL4, PL5, PL6, PR4, PR5, and PR6 are respectively connected via dedicated lines to the I/O ports of the SCB2. The remaining drive means and proximity switches are connected in the same way to the other local control units.

For the exemplary embodiment, the local control units SCB1, SCB2, and SCB3 are configured in such a way that they can each manage up to 16 PDUs and correspondingly also up to 16 covering sensors, as well as up to 32 proximity switches.

We proceed on the assumption that no freight item has reached its end position inside the cargo compartment CD. A first freight item is located in the area of the ball mat BM and must be moved to its end position. A forward movement signal is transmitted with the aid of the joystick connected to the CCB, which signal is converted by the CCB and is transmitted via the CAN bus. The two drive means, the PDUs L1 and R1 in the area of the ball mat BM, are covered by a freight item that is introduced into the cargo compartment. The coverage is detected by the associated covering sensors and is transmitted to the local control unit SCB1. The SCB1 also receives the driving signal via the CAN bus and therefore activates the PDUs L1 and R1 for transporting the freight item into the cargo compartment CD. From the forward-movement signal via the CAN bus and the covering of the PDUs L1 and R1, the SCB1 detects that the freight item will soon reach the PDUs L2 and R2, which are then activated even though they are not yet covered by the freight item. The covering of the PDUs L1 and R1 is signaled to the other local control units via the CAN bus. Each local control unit is thus informed of the current position of the freight item and the total status of the freight loading system from the signal transmitted by the covering sensors. The message, transmitted from a local control unit via the CAN bus, furthermore contains information on the existing PDUs as well as the existing proximity switches and their status.

During the further transport of the freight item into the cargo compartment CD, the PDUs L3 and R3 are activated and are subsequently covered by the freight item, wherein this coverage is reported by the SCB1 via the CAN bus.

Based on the forward-movement signal from the CCB, the information that the PDUs L3 and R3 are positioned at the sector boundary, and the coverage of the PDUs L3 and R3, the SCB2 then determines that the PDUs L4 and R4, which are located in the sector S2 that is controlled by the SCB2, will be next in the transporting sequence. The SCB2 consequently activates the PDUs L4 and R4. The transport of the freight item into the cargo compartment CD continues, until the freight item has reached its end position.

For the exemplary embodiment, the freight item covers the PDUs L8, L9, R8 and R9 when it is in the end position. The freight item is secured in this end position by raising the locking bars which are monitored by the proximity switches PL8 and PR8. The proximity switches PL8 and PR8 report the raising up of the associated locking bars to the SCB3. The SCB3 then transmits a corresponding message via the CAN bus to the other local control units. If a second freight item is moved into the cargo compartment CD, then this item is transported inside the cargo compartment CD in the same way as the first freight item. If the second freight item has been transported far enough into the cargo compartment CD to cover the PDUs L7 and R7, then the SCB3 would normally activate the PDUs L8 and R8. However, since the locking bars assigned to the proximity switches PL8 and PR8 have already been raised, it is not necessary to activate the PDUs L8 and R8, which are arranged behind the raised locking bars as seen in transporting direction.

Even though the preceding explanations relate exclusively to the transport of a freight item into the cargo compartment CD, they can also be used for the reverse process of transporting the item out of the compartment. In that case, the CCB transmits an aft movement signal via the CAN bus, and the local control units determine from this signal, as well as the image and status of the freight loading system, which of the PDUs must be activated. In that case, the PDUs arranged directly behind the PDUs covered by the freight item, as seen in transport direction, are also activated ahead of time and the PDUs arranged behind a raised locking bar, as seen when looking into the cargo compartment CD, are not activated.

According to one modified embodiment of the example, the freight loading system is designed for freight items having two different, standardized sizes. As a result, the installation of locking bars at several locations is necessary for securing the freight item, in dependence on the different sizes. In concrete terms, it means that two locking bars and thus also two proximity switches are arranged in front of each PDU, which make it possible to realize the most varied loading scenarios.

The different positions which can be occupied by the PDUs and the locking bars/proximity switches within one sector are stored in the firmware of each local control unit. The information on which of these positions is occupied also reflects the complete structure of the sector. As a result, it is only necessary to transmit via the CAN bus which PDUs are present, which PDUs are covered, which proximity switches exist, and which proximity switches are activated. The sector status is preferably encoded in a bit pattern since it primarily relates to binary information. Owing to the fact that the status object standardized for the CAN bus provides eight byte useful data, the existing PDUs, the existing proximity switches, the covered PDUs and the activated proximity switches are respectively encoded in two bytes. The sector status for a total of 16 PDUs and 16 proximity switches can therefore be transmitted in one status object.

The CAN bus addresses for the local control units preferably follow a pattern known to the local control units, for example the continuous output of addresses. As a result, each local control unit can determine from the address of a different local control unit the position of the sector that is controlled by the other control unit within the cargo compartment CD.

For the exemplary embodiment shown in FIG. 1, each sector is provided with three PDUs and three proximity switches in each row. The four bytes in which the existing PDUs and proximity switches are encoded therefore read concurrently 00000111. Based on this bit pattern for the existing PDUs in each row of the sector S1, the SCB2 determines, for example, that the PDUs L4 of the sector S2 follow the PDUs L3 of the sector S1 and that the PDUs R4 of the sector S2 follow the PDUs R3 of the sector S1.

As previously described for one modification of the exemplary embodiment, two locking bars and thus also two proximity switches are installed in front of each PDU. The size of the freight item in that case determines which of the two locking bars is raised for securing the freight item. However, only one of the two locking bars can be raised in each case. The output signals from the two proximity switches in front of each PDU can therefore be subjected to an OR connection in the local control unit, wherein the result of this connection is encoded in the message detailing the sector status. The number of bits available in the status object is therefore also sufficient for the modified embodiment with two locking bars.

Starting with the exemplary embodiment, we want to consider a situation where the first freight item is locked in place in its end position while the second freight item has not yet been moved into the cargo compartment CD. The PDUs L8, L9, R8 and R9 are covered and the proximity switches PL8 and PR8 signal to the SCB3 that the associated locking bars have been raised. In addition to the above-derived bit pattern of 00000111 for the four bytes of the existing PDUs and the proximity switches, the bit pattern 00000110 is respectively obtained for the two bytes of the covered PDUs while the bit pattern 00000010 is obtained for the status bytes of the proximity switches.

Once a freight item has reached its end position, the PDUs covered by this freight item are preferably operated in the hold mode, despite the fact that the freight item is locked in place, until a different freight item has reached its end position and the proximity switches at this location indicate that the freight item is secured. As a result, the freight item is continuously protected against displacement, which also increases the operational safety for the personnel.

The driving signal transmitted by the CCB via the CAN bus is preferably repeated cyclically, thereby ensuring that the activated PDUs are switched off, even if the associated local control unit did not receive a stop signal. Active PDUs can thus be switched off immediately or moved to the hold mode, for example in case of a malfunction in the CAN bus.

The above-described embodiment is purely exemplary and insofar is not restricting. In particular the dimensions, the number of and the arrangement of the sectors can vary, wherein the sectors in principle do not have to be identical in size and can respectively be provided with an optional number of drive means and sensors. For example, it is possible to leave the positions for the drive means unoccupied, which is represented by zeros in the respective bit pattern. Given the option of arranging an additional PDU between the PDUs R1 and R2 and/or R2 and R3, based on the freight loading system according to FIG. 1, which positions would be unoccupied, this it would result in the bit pattern 00010101 for the occupied PDU positions in the right-hand row. The arrangement of the drive means and the proximity switches within a sector can also be changed without straying from the inventive idea.

The invention claimed is:

1. A scalable freight loading system, comprising:
    power drive units, covering sensors, locking bars, proximity switches and a central control unit, a loading surface includes sectors, local control units each having I/O ports, wherein one of the local control units is assigned to one respective sector; wherein of the local control units, the power drive units, the covering sensors and the proximity switches of a sector are solely connected to the I/O ports of the local control unit for the respective sector; and the local control units are connected via a bus system to the central control unit.

2. The freight loading system according to claim 1, wherein the local control units include a means for storing the statuses of all the sectors.

3. The freight loading system according to claim 1, wherein the power drive units comprise floor conveyors.

4. The freight loading system according to claim 1, wherein the bus system comprises a CAN bus.

5. A method for operating a scalable freight loading system according to claim 1, wherein the local control units use the bus system in order to transmit the status of the power drive units, the covering sensors and the proximity switches.

6. The method according to claim 5, wherein the respective local control unit transmits the sector status at the start-up of the freight loading system and/or in the event of a change in the sector status.

7. The method according to claim 5, wherein the sector status is transmitted has a standardized status object of the CAN bus.

8. The method according to claim 5, wherein the power drive unit which is not covered by a freight item is activated if it is arranged behind another power drive unit covered by the freight item, as seen in transporting direction.

9. The method according to claim 5, further comprising:
    determining when the locking bar is raised; and
    further comprising the step of not activating the power drive unit for the locking bar that is raised.

* * * * *